United States Patent
Hathorn et al.

(10) Patent No.: US 11,245,521 B2
(45) Date of Patent: *Feb. 8, 2022

(54) REVERTING FROM A NEW SECURITY ASSOCIATION TO A PREVIOUS SECURITY ASSOCIATION IN RESPONSE TO AN ERROR DURING A REKEY OPERATION

(71) Applicant: INTERNATIONAL BUSINESS MACHINES CORPORATION, Armonk, NY (US)

(72) Inventors: Roger G. Hathorn, Tucson, AZ (US); Patricia G. Driever, Poughkeepsie, NY (US); Christopher J. Colonna, Ossining, NY (US); Mooheng Zee, Fishkill, NY (US); John R. Flanagan, Chapel Hill, NC (US); Alol Antony Crasta, Bangalore (IN); Mikel William Welsh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/583,173

(22) Filed: Sep. 25, 2019

(65) Prior Publication Data
US 2021/0091943 A1 Mar. 25, 2021

(51) Int. Cl.
*H04L 9/08* (2006.01)
*G06F 21/30* (2013.01)
(Continued)

(52) U.S. Cl.
CPC ............ *H04L 9/0891* (2013.01); *G06F 21/30* (2013.01); *H04L 63/062* (2013.01);
(Continued)

(58) Field of Classification Search
CPC . H04L 9/0891; H04L 63/0823; H04L 63/062; H04W 12/069; H04W 12/0433;
(Continued)

(56) References Cited

U.S. PATENT DOCUMENTS 6,219,771 B1 4/2001 Kikuchi et al.
6,832,313 B1 12/2004 Parker
(Continued)

FOREIGN PATENT DOCUMENTS

CN 102063583 A 5/2011
CN 103425916 A 12/2013
(Continued)

OTHER PUBLICATIONS

"Amazon Web Services: Overview of Security Processes", Amazon, 2018, pp. 95.
(Continued)

*Primary Examiner* — Cheng-Feng Huang
(74) *Attorney, Agent, or Firm* — Konrad Raynes Davda & Victor LLP; David W. Victor

(57) ABSTRACT

Provided are a computer program product, system, and method embodiments for reverting from a new security association to a previous security association in response to an error during a rekey operation. An initiator maintains a first security association with the responder having a first key to use to encrypt and decrypt data transmitted with the responder. The initiator initiates a rekey operation to establish a second security association with the responder using a second key. The initiator detects a failure of the rekey operation after the responder started using the second key for transmissions. A revert message is sent to the responder to revert back to using the first security association and first key in response to detecting the failure of the rekey operation.

22 Claims, 10 Drawing Sheets

(51) Int. Cl.
  *H04L 29/06* (2006.01)
  *H04W 12/069* (2021.01)
  *H04W 12/0433* (2021.01)

(52) U.S. Cl.
  CPC ..... *H04L 63/0823* (2013.01); *H04W 12/0433* (2021.01); *H04W 12/069* (2021.01)

(58) Field of Classification Search
  CPC . G06F 21/30; G06F 2221/2129; G06F 21/445
  See application file for complete search history.

(56) References Cited

U.S. PATENT DOCUMENTS

| | | | |
|---|---|---|---|
| 7,234,063 B1* | 6/2007 | Baugher | H04L 9/0833 380/259 |
| 8,250,625 B2 | 8/2012 | Risley | |
| 8,275,950 B2 | 9/2012 | Sanada et al. | |
| 8,479,266 B1 | 7/2013 | Delker et al. | |
| 8,504,823 B2 | 8/2013 | Carpenter et al. | |
| 8,649,768 B1 | 2/2014 | Gaddam et al. | |
| 8,718,281 B2* | 5/2014 | Mishra | H04L 9/0891 380/277 |
| 8,799,436 B2 | 8/2014 | Ayachitula et al. | |
| 8,844,025 B2 | 9/2014 | Russo et al. | |
| 9,002,016 B2* | 4/2015 | Mishra | H04L 9/0891 380/277 |
| 9,043,883 B2 | 5/2015 | Touve et al. | |
| 9,058,191 B2 | 6/2015 | Gupta et al. | |
| 9,143,937 B2 | 9/2015 | Cherian et al. | |
| 9,246,898 B2 | 1/2016 | McKeeman et al. | |
| 9,882,713 B1* | 1/2018 | Raza | H04L 9/0825 |
| 10,033,702 B2 | 7/2018 | Ford et al. | |
| 10,324,507 B2 | 6/2019 | Mullins et al. | |
| 10,609,008 B2 | 3/2020 | Vemulapalli et al. | |
| 2004/0107342 A1 | 6/2004 | Pham et al. | |
| 2004/0184605 A1* | 9/2004 | Soliman | H04L 9/321 380/44 |
| 2007/0253554 A1* | 11/2007 | Chesson | H04L 9/0891 380/273 |
| 2010/0154053 A1 | 6/2010 | Dodgson et al. | |
| 2016/0080424 A1* | 3/2016 | Hasegawa | H04W 12/047 726/1 |
| 2016/0139845 A1 | 5/2016 | Muhlestein et al. | |
| 2016/0342798 A1 | 11/2016 | Smith et al. | |
| 2016/0378691 A1 | 12/2016 | Sherman | |
| 2018/0167206 A1* | 6/2018 | Raza | H04L 9/0825 |
| 2018/0367516 A1 | 12/2018 | Mundra et al. | |
| 2019/0116052 A1 | 4/2019 | Kim et al. | |
| 2019/0213104 A1 | 7/2019 | Qadri et al. | |
| 2019/0251282 A1 | 8/2019 | Patel et al. | |
| 2020/0099672 A1* | 3/2020 | Persaud | H04L 9/12 |
| 2020/0366478 A1* | 11/2020 | Mestery | H04L 9/0861 |

FOREIGN PATENT DOCUMENTS

| | | | | |
|---|---|---|---|---|
| CN | 209057241 | | 7/2019 | |
| EP | 1276034 | A2 | 1/2003 | |
| EP | 3122086 | | 1/2017 | |
| EP | 3122086 | A1 * | 1/2017 | ............. H04W 8/26 |
| KR | 101552950 | B1 | 9/2015 | |
| WO | 2018226265 | A1 | 12/2018 | |

OTHER PUBLICATIONS

"Introduction to AWS Security Processes", Amazon, Jun. 2016, pp. 45.
M.K. Sah, et al., "Security and Concurrency Control in Distributed Database System", International Journal of scientific research and management, vol. 2, Issue 12, pp. 1839-1845, 2017.
Anonymous, "Cognitive Storage Subsystem Secure Volumes", ip.com, IP.com No. IPCOM000253178D, Mar. 12, 2018, pp. 4.
Anonymous, "Methodology and Procedure for Secure Granular Authorization and Audit Implementation in Distributed Enterprise Computing Environment", ip.com, IP.com No. IPCOM000237293D, Jun. 11, 2014, pp. 18.
Anonymous, "A Method and System for Providing High Transaction Rate Authentication using Multiple Secondary Real Time Authentication Parameters", IP.com, IP.com No. IPCOM000229944D, Aug. 8, 2013, pp. 2.
Anonymous, "System for Optimizing Authentication in a Multi-Threaded Environment", IP.com, IP.com No. IPCOM000223083D, Nov. 1, 2012, pp. 4.
"Storage device and system with authentication mechanism", IP.com, IP.com No. IPCOM000225630D, Feb. 22, 2013, pp. 4.
Anonymous, "Method for Flexible and Diverse Error Handling for Storage Devices", IP.com, IP.com No. IPCOM000233966D, Jan. 6, 2014, pp. 7.
Anonymous, "Method and Apparatus for Authentication in Storage Systems using QR code", IP.com, IP.com No. IPCOM000255722D, Oct. 11, 2018, pp. 6.
Anonymous, "Port Based Network Security for communication networks in a gaming environment", IP.com, IP.com No. IPCOM000166456D, Jan. 11, 2008, pp. 3.
IBM, "Automation of authentication with use of internal and external key parameters", IP.com, IP.com No. IPCOM000180832D, Mar. 18, 2009, pp. 5.
Anonymous, "Provide Java APIs into the IUCV protocol", IP.com, IP.com No. IPCOM000244583D, Dec. 23, 2015, pp. 4.
Wale Amol, D., & Rastogi, V. Data Integrity Auditing of Cloud Storage. International Journal of Computer Applications, Jan. 2016, pp. 5.
A. Vasudevan, et al., "Lockdown: Towards a safe and practical architecture for security applications on commodity platforms", In International Conference on Trust and Trustworthy Computing (pp. 34-54). Springer, Berlin, Heidelberg, Jun. 2012.
J.K Resch, et al. "AONT-RS: Blending Security and Performance in Dispersed Storage Systems", 2017, pp. 12.
A. Buecker, et al. "Reduce Risk and Improve Security on IBM Mainframes: Volume 3 Mainframe Subsystem and Application Security", IBM Corporation, Redbooks, Document No. SG24-8196-00, Nov. 2015, pp. 200.
F.Majstor, Storage Area Networks Security Protocols and Mechanisms, Apr. 2004, pp. 21.
M. Lippett, et al., "Networked Storage Concepts and Protocols", EMC2 Techbooks, EMC Corporation, 2008, pp. 370.
J.Tate, et al., "IBM SAN Survival Guide", IBM Corporation, Redbooks, Document No. SG24-6143-01, Aug. 2003, pp. 662.
"Storage Security: Fibre Channel Security", SNIA, Technical White Paper, Version 1, May 2016, pp. 29.
"Fibre Channel Framing and Signaling—5", INCITS, INCITS working draft proposed American National Standard for Information Technology, Apr. 3, 2018, pp. 506.
"Fibre Channel Link Services Rev 4.04", INCITS, INCITS working draft proposed American National Standard for Information Technology, Jul. 16, 2019, pp. 238.
"Fibre Channel Security Protocols—2", INCITS, INCITS working draft proposed American National Standard for Information Technology, Jun. 12, 2012, pp. 312.
B. Aboba, et al. "Securing Block Storage Protocols over IP", The Internet Society, Apr. 2004, [online][retrieved Aug. 26, 2019] https://tools.ietf.org/html/rfc3723, pp. 70.
"Information Technology Fibre Channel Part 432: Security Protocols—2", ISO/IEC, pp. 312.
"Understanding FC (and FCoE) fabric configuration in 5 minutes or less", Stevenu, Mar. 20, 2012, pp. 8, [online] [retrieved Aug. 26, 2019] https://blog.osnexus.com/2012/03/20/understanding-fc-fabric-configurati . . . .
Anonymous, "USB Trust Extensions for secured USB devices", IP.com, IP.com No. IPCOM000245301D, Feb. 26, 2016, pp. 8.
"Dell EMC PowerMax Reliability, Availability, and Serviceability Technical White Paper", Dell EMC, Oct. 2018, pp. 32.
"vSphere Security", VMWare, Inc., 2009, pp. 258.
U.S. Appl. No. 16/568,176, filed Sep. 11, 2019.
U.S. Appl. No. 16/568,117, filed Sep. 11, 2019.

(56) References Cited

OTHER PUBLICATIONS

U.S. Appl. No. 16/583,178, filed Sep. 25, 2019.
U.S. Appl. No. 16/568,160, filed Sep. 11, 2019.
U.S. Appl. No. 16/568,124, filed Sep. 11, 2019.
U.S. Appl. No. 16/568,131, filed Sep. 11, 2019.
U.S. Appl. No. 16/568,174 filed Sep. 11, 2019.
English machine translation for CN209057241 dated Dec. 4, 2013, pp. 6.
English machine translation for CN103425916 dated Dec. 4, 2013, pp. 12.
English machine translation of CN102063583 dated May 18, 2011, pp. 20.
English machine translation for KR101552950 dated Sep. 14, 2015, pp. 16.
List of IBM Patents and Applications Treated as Related, dated Oct. 21, 2019, pp. 2.
Transmittal of Information on Confidential Activities dated Mar. 3, 2020, pp. 1.
Response to Office Action, dated Aug. 9, 2021, for U.S. Appl. No. 16/583,178, filed Sep. 25, 2019, Total 13 pages.
Transmittal of Information on Confidential Activities dated Feb. 26, 2020, pp.
Office Action, dated May 7, 2021, for U.S. Appl. No. 16/583,178, filed Sep. 25, 2019, Total 47 pages.
Final Office Action, dated Oct. 7, 2021, for U.S. Appl. No. 16/583,178, filed Sep. 25, 2019, Total 45 pages.

\* cited by examiner

Security Association

REVERTING FROM A NEW SECURITY ASSOCIATION TO A PREVIOUS SECURITY ASSOCIATION IN RESPONSE TO AN ERROR DURING A REKEY OPERATION

BACKGROUND OF THE INVENTION

1. Field of the Invention

The present invention relates to a computer program product, system, and method for reverting from a new security association to a previous security association in response to an error during a rekey operation.

2. Description of the Related Art

In a Fibre Channel environment, to provide for secure and encrypted communication between nodes in a Fabric, a Security Association (SA) management transaction occurs between an SA_Initiator and an SA_Responder using a security establishment protocol. The security association management protocol may be initiated by an authentication responder of the Fibre Channel authentication protocol. The initiator and responders may comprise ports in host bus adaptors in devices in a Fibre Channel network. Separate security associations are established for data transmission and data reception at a port. Completion of the SA establishment transaction results in a set of security associations and related key material used to encrypt/decrypt data communication between the initiator and the target under the established security association.

The cryptographic keys used to secure data in the security association for transmission and reception may be refreshed periodically as part of a rekey operation, which involves repeating the security establishment protocol and reauthentication. An example of a security association protocol is the Security Association Management protocol in the T11 Fibre Channel Security Protocol Standard FC-SP-2, which is similar to protocols defined by internet protocol standards such as Internet Key Exchange version 2 (IKEv2). The protocol consists of a pair of messages, SA_Init and SA_Init Response to establish a parent association followed by a pair of messages, SA_Auth and SA_Auth Response to perform authentication of the entitles and establish the Security Associations that protect the data transferred between the entitles.

When using re-authentication to perform a rekey operation, multiple security associations are maintained at the initiator and target until the old security association is deleted. In certain implementations, to avoid traffic loss during this time, transmission of data using the new security association is delayed until sometime after reception of a delete request from the responder. If errors occur in the messaging to establish the new security associations, inconsistent states and traffic loss may result.

There is a need in the art for improved techniques for establishing security associations for transmission of data between nodes.

SUMMARY

Provided are a computer program product, system, and method embodiments for reverting from a new security association to a previous security association in response to an error during a rekey operation. An initiator maintains a first security association with the responder having a first key to use to encrypt and decrypt data transmitted with the responder. The initiator initiates a rekey operation to establish a second security association with the responder using a second key. The initiator detects a failure of the rekey operation after the responder started using the second key for transmissions. A revert message is sent to the responder to revert back to using the first security association and first key in response to detecting the failure of the rekey operation.

The above embodiments address a situation where a failure occurs during a rekey operation and is detected by the initiator. In such case, the responder may have started already using the new security association so certain messages may by secured or encrypted using the new second security association. To avoid inconsistencies resulting from this situation, the initiator sends a revert message to the responder to revert back to using the first security association, which allows the initiator and responder to make the transition and address the situation where there may be messages already in the system encrypted using the new security association.

Further provided are a computer program product, system, and method embodiments for reverting from a new security association to a previous security association in response to an error during a rekey operation. An initiator maintains a first security association with the responder having a first key to use to encrypt and decrypt data transmitted with the responder. The initiator maintains a first security association with the responder having a first key to use to encrypt and decrypt data transmitted with the responder. The initiator sends a security association initialization message to the responder to establish a second security association with the responder including key material used to generate a second key for the second security association. In response to receiving a security association initialization response to accept the second security association, the initiator sends an authentication message to the responder to program the responder to establish authentication between the responder and the initiator. In response to not receiving an authentication done message from the responder after activating the second security association upon expiration of a timer, the initiator sends a revert message to the responder to revert back to using the first security association and first key.

With the above embodiments, after the initiator sends the authentication message, but before the responder has responded with authentication done, the responder may have started using the new second security association message to encrypt messages. The initiator may detect failure in communication if the authentication done message is not received before expiration of a timer. To avoid inconsistencies resulting from this situation, the initiator sends a revert message to the responder to revert back to using the first security association, which allows the responder to transition back to using the first security association in a manner that addresses the situation where there may be messages already in the system encrypted using the new security association.

The subject matter of the embodiments may optionally include an optional embodiment of the initiator sending a message to the responder to initiate the rekey operation and establish the second security association with the responder including key material used to generate the second key for the second security association. The initiator further starts a timer in response to sending the message. The initiator detects a failure of the rekey operation in response to the timer expiring before receiving a message from the responder indicating that the second security association is activated.

With the above embodiment, the initiator detects a failure in the rekey operation by starting a timer when the rekey operation is initiated and if the initiator does not receive a message from the responder indicating the new second security association is activated before expiration of the timer, then failure of the rekey operation is detected. With this embodiment, a timeout of the rekey operation not completing within a timeout value measured by the timer causes the initiator to start a revert operation to have the responder revert back to using the previous or first security association.

The subject matter of the embodiments may optionally include an optional embodiment of the initiator receiving a response from the responder to the revert message indicating that the second security association is invalidated and the responder reverted back to using the first security association for transmissions.

With the above embodiment, upon receiving the response from the responder indicating that the revert successfully completed, the initiator can take further actions based on the knowledge that the responder successfully completed reverting back to the first previous security association and use that first security association to encrypt message.

The subject matter of the embodiments may optionally include an optional embodiment of the initiator starting a revert timer in response to receiving the response from the responder to the revert message. During the revert timer, the second key is used to access secure transmissions from the responder secured with the second key of the second security association at the responder. The initiator invalidates the second security association in response to the revert timer expiring.

With the above embodiment, the initiator delays removing the first security association after sending the revert message for a revert time in order to maintain the second security association to use to decrypt and access any messages sent by the responder that are secured with the second security association. The expiration of the revert timer is used to indicate that all messages encrypted by the second security association will likely have been flushed out of the system, so the second security association may now be invalidated and safely removed.

The subject matter of the embodiments may optionally include an optional embodiment of the initiator retrying the rekey operation in response to the revert timer expiring.

With the above embodiment, after the revert timer has expired at the initiator, both the responder and initiator will have reverted back to using the previous or first security association and invalidated the second security association, so that the rekey operation may be retried again without any inconsistencies resulting from messages being encrypted with the invalidated second security association.

DETAILED DESCRIPTION

Described embodiments provide improvements to computer technology for establishing a security association between an initiator and responder in a network. Described embodiments avoid inconsistent states due to errors when establishing a security association and authentication of nodes by having the responder node send a final authentication done message to the initiator. The responder sends the authentication done message to confirm to the initiator that the responder has successfully completed authentication and has activated the new security association for immediate use. This allows the responder to begin using the new security association for transmission upon the completion of the security association management transaction rather than waiting to delete the old security association. In described embodiments, the old security association is maintained for reception of data for a period of time after the new security association is established for those messages coded with the key for the old security association. The delay is of sufficient length to allow all messages coded with the old security to be flushed from the system before deleting the old security association. This eliminates any potential issues with loss, as messages encrypted (secured) with the old security association cannot be processed (decrypted) once the old security association is removed.

Described embodiments provide further improvements to computer technology to handle a failure in the establishment of the security association, such as when the authentication done message fails. Upon the initiator detecting a failure in establishing the new security association, such as if the initiator does not receive the authentication done message, the initiator may send a revert message to the responder to revert back to using a prior security association and invalidate the new security association the initiator attempted to establish for a rekey operation Further, to ensure that the responder flushes out all messages transmitted using the new security association after being activated before the authentication done message was sent, the responder will set a revert timer to delay invalidating the second security association until the timer expires.

Figure 1:
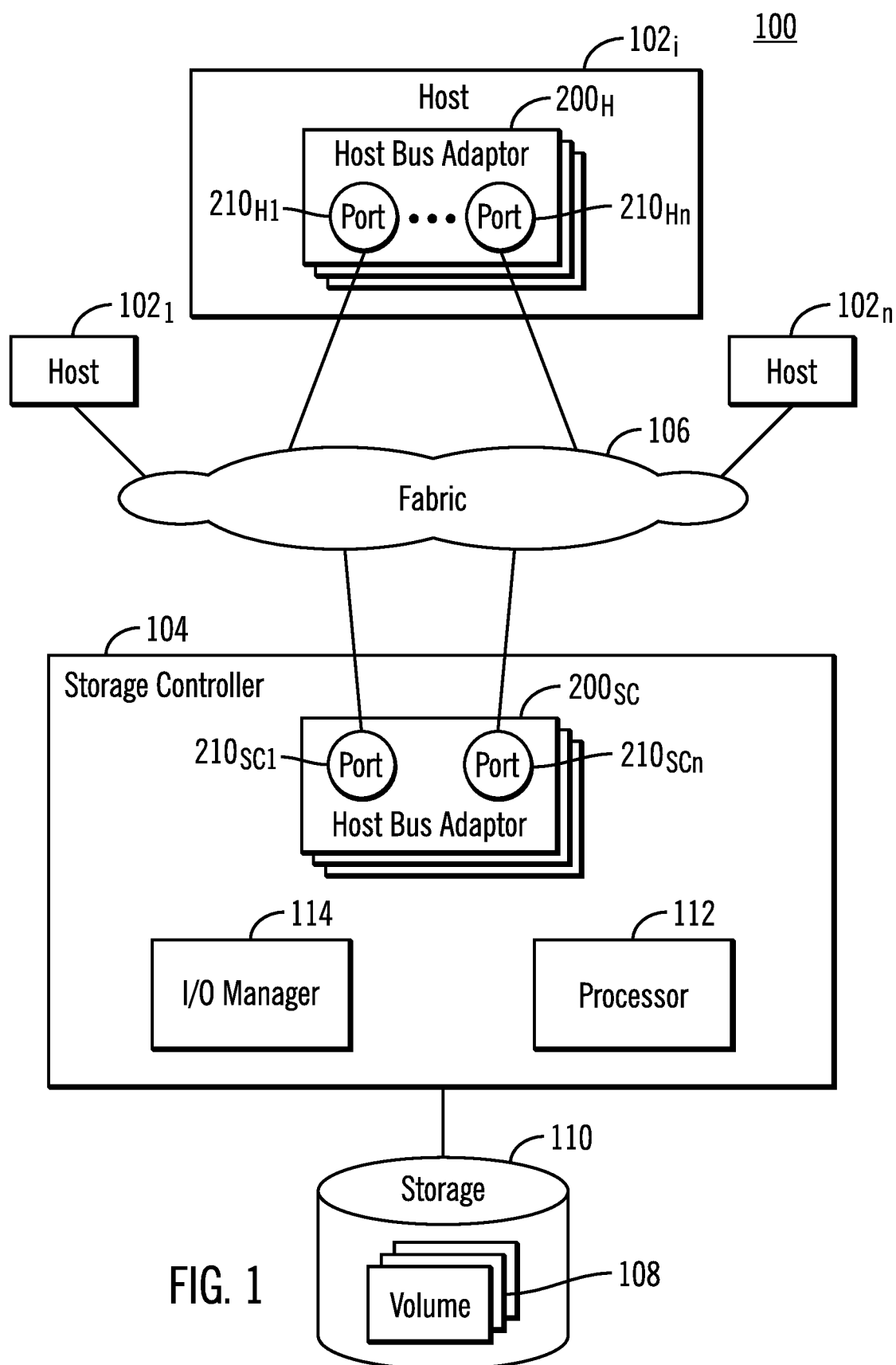
FIG. 1 illustrates an embodiment of a network computing environment.

FIG. 1 illustrates an embodiment of a network computing environment 100 in which a plurality of hosts $102_1$, $102_2$ . . . $102_n$ may submit Input/Output (I/O) requests to a storage controller 104 over a fabric (network) 106 to access data at volumes 108 (e.g., Logical Unit Numbers, Logical Devices, Logical Subsystems, etc.) in a storage 110. The storage controller 104 includes one or more processors 112 and an I/O manager 114 for managing the transfer of tracks transferred between the hosts $102_1$, $102_2$ . . . $102_n$ and the storage. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

Each of the hosts, as shown with respect to host $102_i$ have one or more host bus adaptors (HBAs) $200_H$ having a plurality of ports $210_{H1} \ldots 210_{Hn}$ to connect to a fabric 106 of switches. The storage controller 140 includes one or more host bus adaptors (HBAs) $200_{SC}$ having a plurality of ports $210_{SC1} \ldots 210_{SCn}$ to connect to the fabric 106 of switches. Alternatively, host ports $210_{Hi}$ and storage controller ports $210_{SCi}$ may connect directly via cable.

In one embodiment, the fabric 106 may comprise a Storage Area Network (SAN) comprising implemented with a Fibre Channel topology. The $210_{Hi}$, $210_{SCi}$ may comprise Fibre Channel nodes that connect to Fibre Channel switches in the fabric 106. In alternative embodiments, the fabric 106 may comprise other types of networks, such as a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

In described embodiments, the messaging between an initiator port and responder port are described with respect to the Fibre Channel protocol. In alternative embodiments, alternative network protocols may be used for transmitting messages between an initiator node that initiates establishment of a new security association and authentication and a responder node that responds to the request to establish a new security association and authentication for a pair of ports.

An initiator as that term is used herein refers to any device involved in initiating establishment of a security association and authentication with a responder, which refers to any device involved in responding to the establishment of the security association and authentication initiated by the initiator to provide secure communication between the initiator and the responder. The elements that function as the initiator and responder may be referred to as an initiator and responder, which may also be referred to as initiator port and responder port, initiator node and responder node, initiator HBA and responder HBA, as source node for the initiator and target node for the responder, as host port for the initiator and storage controller port for the responder, etc.

The fabric controller 202 and security association manager 206 may comprise program code loaded into a memory and executed by one or more processors. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 2:
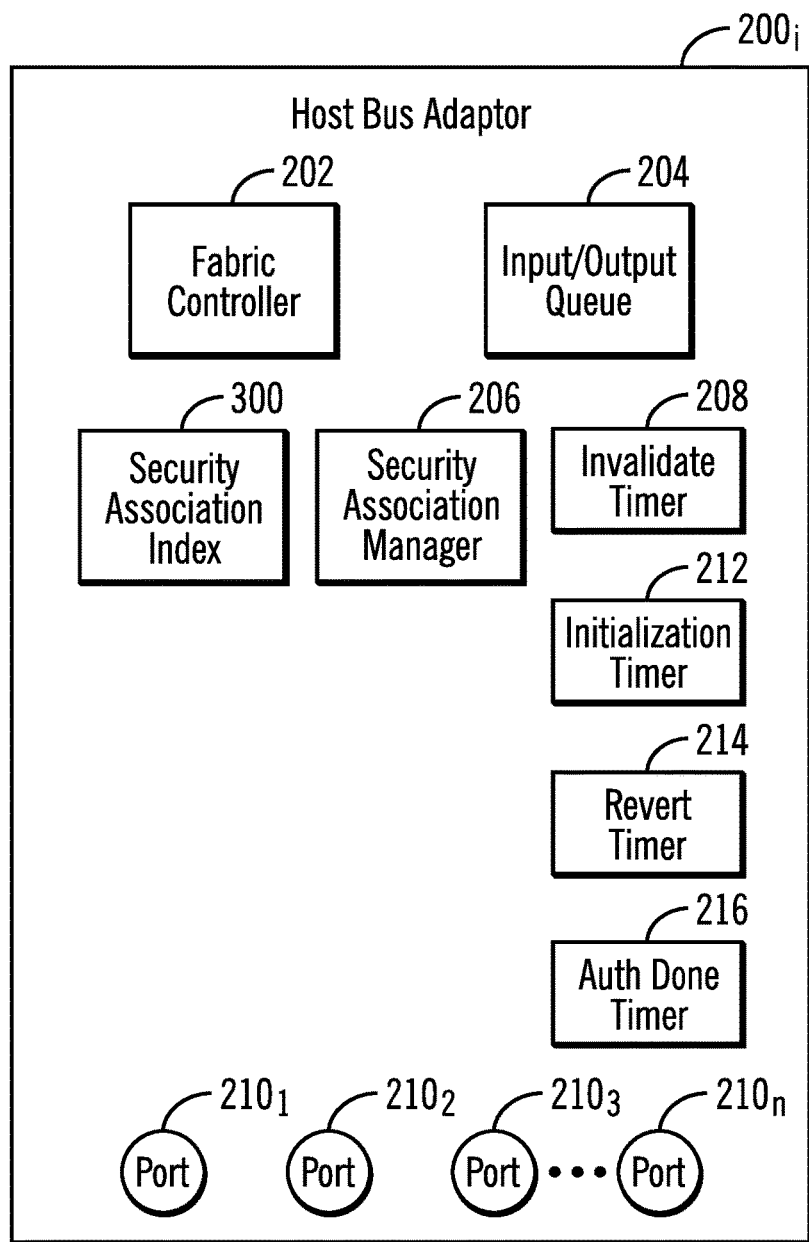
FIG. 2 illustrates an embodiment of a host bus adaptor.

FIG. 2 illustrates an embodiment of a host bus adaptor (HBA) $200_i$, such as a host HBA $200_H$ and storage controller HBA $200_{SC}$. The HBA $200_i$ includes a fabric controller 202 implementing a fabric protocol, such as the Fibre Channel protocol or other network protocols known in the art, to initialize and authenticate connections and manage I/O operations; an I/O queue 204 to queue I/O requests to send or receive with respect to other HBA ports on other devices; a security association index 300 having initialized security associations providing keys to encrypt and decrypt data from another fabric port; a security association manager 206 to negotiate and establish a security association $300_i$ with another node port in the fabric 106, wherein one port at one node functions as an initiator to communicate with a port on another node functioning as a responder; and an invalidate timer 208 used to determine when to invalidate a previous security association after performing a rekey operation to establish a new security association and new key to use for encryption/decryption. The HBA $200_i$ includes one or more ports $210_1 \ldots 210_n$, that may function as initiator or responder ports to communicate on the fabric 106.

The HBA $200_i$ may further include an initialization timer 212 started by an initiator HBA $200_I$ in response to sending an security association initialization message, such that the authentication transaction is failed if an authentication done message is not received from a responder HBA $200_R$ within the initialization timer 212 timeout value; a revert timer 214 started by the responder HBA $200_R$ in response to a revert message from the initiator HBA $200_I$, such that the recently established security association is invalidated after the revert timer 214 expires; and an authorization done timer the responder HBA $200_R$ starts after sending the authentication done message, such that an abort message is sent if the authentication done timer 216 expires without receiving an accept message from the initiator HBA $200_I$ to the authentication done message. In one embodiment, the authentication done timer 216 is less than the invalidate timer 208 to allow the invalidate timer 208 to continue if the shorter authentication done timer expires. The timers 208, 212, 214, 216 may be expressed as timeout values that are used for the timers.

The security association manager 206 may also implement an authentication protocol to authenticate the identity of an initiator and responder to each other as part of establishing the security association for a security association pair between an initiator port and responder port. In certain embodiments, after the security association exchange has completed, authentication messages may be exchanged to authenticate the initiator port and responder port and exchange identities. For purposes of describing establishing a security association and authentication between an initiator port and a responder port, reference is made to initiator port $118_I$ in the host HBA $200_H$ and a responder port $122_R$ in the storage controller HBA $200_{SC}$. In further embodiments, the initiator and responder ports may be implemented in other types of devices that communicate over a fabric 106.

Figure 3:
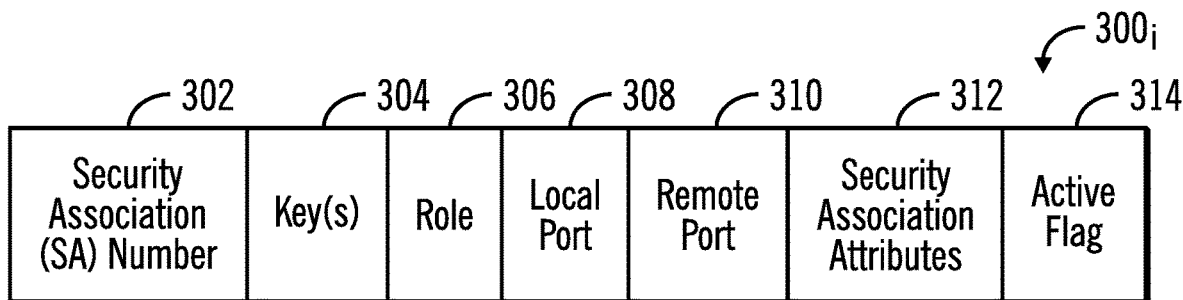
FIG. 3 illustrates an embodiment of a security association.

FIG. 3 illustrates an embodiment of an instance of a security association $300_i$ in the security association index 300, and includes a security association (SA) number 302; one or more keys 304 used to encrypt and decrypt messages with another node; a role 306 indicating whether a local port 308 involved in the security association is an initiator or responder; a remote port 310 at another device involved in the security association 302 that is subject to secure transmission with the local port 308; security association attributes 312, such as transform type used to encrypt/decrypt messages, transform attributes, nonces, and key material used to seed and generate the key; and an active flag 314 indicating whether the security association $300_i$ is actively being used to encrypt and decrypt messages. Messages would indicate the security association number 302 in the header of the security association used to encrypt and decrypt a message.

Figure 4:
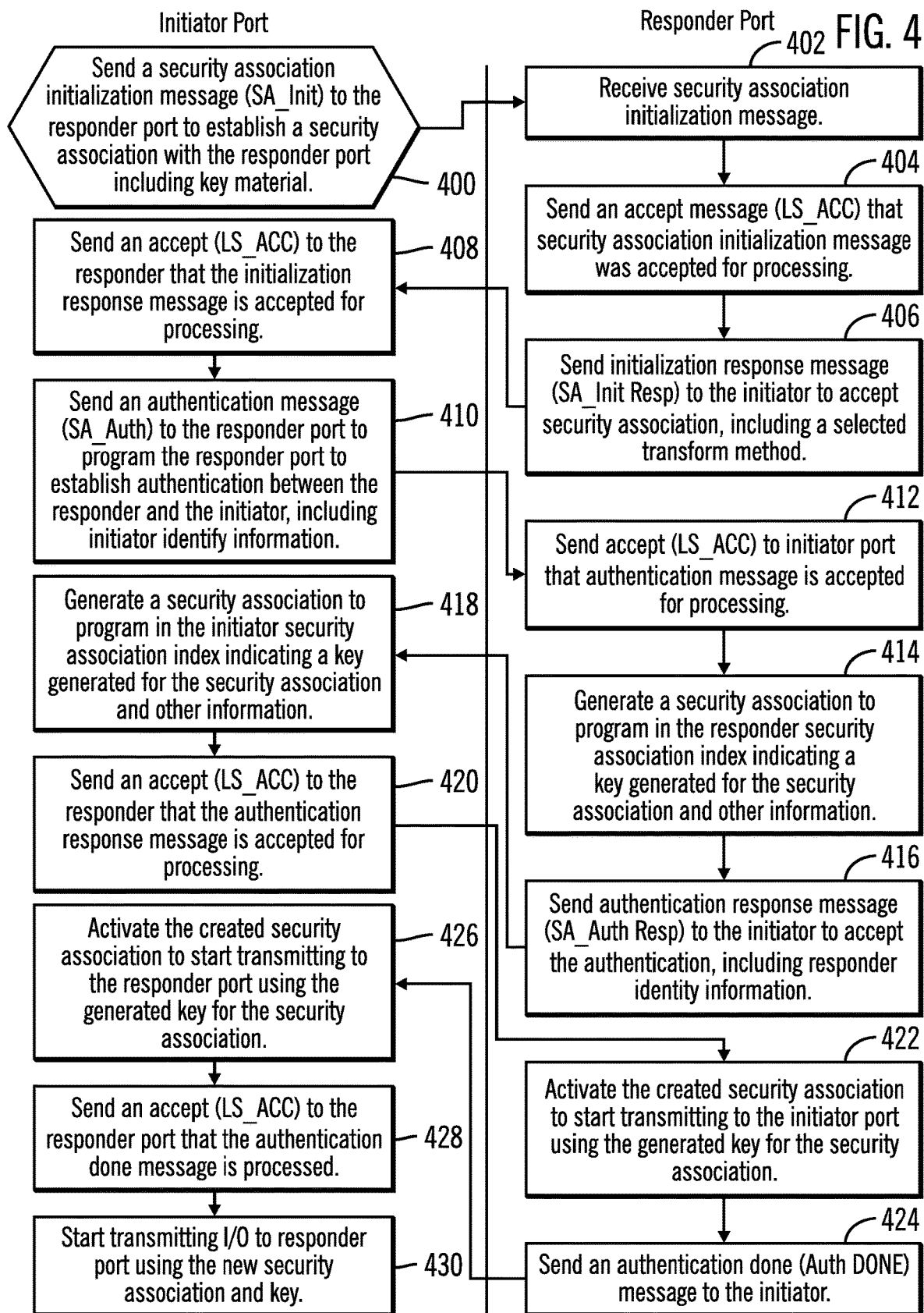
FIG. 4 illustrates an embodiment of operations to establish a security association and authentication between an initiator and responder nodes.

FIG. 4 illustrates an embodiment of operations performed by the security association manager 206 implemented in two HBAs $200_i$, one functioning as an initiator HBA $200_I$ initiating a security association management transaction from an initiator port $210_I$ in the initiator HBA $200_I$ and another functioning as a responder HBA $200_R$ responding to a security association management transaction at a responder port $210_R$ in the responder HBA $200_R$. In one implementation, the host HBA $200_H$ functions as the initiator and the storage controller HBA $200_{SC}$ functions as a responder. In further embodiments, other combinations of devices may have the HBAs operating as initiator or responder for different ports. To initiate operations to establish a security association $300_i$, the initiator HBA $200_I$ sends (at block 400) a security association initialization message (SA_Init) from the initiator port $210_I$ to the responder port $210_R$ to establish a security association with the responder port $210_R$ including key material used to create a encryption key. Upon receiving (at block 402) the security association initialization message, the responder HBA $200_R$ sends (at block 404) an acceptance of the security association initialization message for processing to the initiator port $210_I$. In Fibre Channel protocol implementations, an accept for processing message may take the form of the link services accept message (LS_ACC). After the accept is sent, the responder HBA $200_R$ sends (at block 406) an initialization response message (SA_Init Resp) to the initiator port $210_I$ to accept the security association, including a selected transform method to use for encryption/decryption. The security association initialization message may include a plurality of different encryption transform methods from which the responder HBA $200_R$ may select to use for the security association $300_i$ being established.

Upon receiving the send initialization response message (SA_Init Resp), the initiator HBA $200_I$ sends (at block 408) an accept (LS_ACC) to the responder port $210_R$ that the initialization response message is accepted for processing and then sends (at block 410) an authentication message (SA_Auth) to the responder port $210_R$ to program the responder port $210_R$ to establish authentication between the responder and the initiator, including initiator identify information. The initiator identity information may comprise a certificate for the entity having the initiator port $210_I$, such as the host $102_i$. Upon receiving the security association authentication message (SA_Auth), the responder HBA $210_R$ sends an accept message (LS_ACC) to the initiator port $210_I$ that the authentication message was accepted for processing and then generates (at block 414) a security association $300_i$, including the key 304 or keys needed to perform decryption and encryption with messages from the initiator port $210_I$, to program in the responder security association index 300 indicating the key generated for the security association $300_I$ and other information. After programming the responder HBA $200_R$ with the security association $300_i$ for the responder port $210_R$, the responder HBA $200_R$ sends (at block 416) an authentication response message (SA_Auth Resp) to the initiator port $210_I$ to accept the authentication, including responder identity information, such as an identity of the entity including the responder HBA $200_R$, such as a storage controller 104.

Upon receiving the security association authentication response message, the initiator HBA $200_I$ generates (at block 418) a security association $300_i$ to program in the initiator security association index 300 to indicate a key 304 generated for the security association $300_I$ and other information. After programming the security association $300_I$ in the initiator index 300, the initiator HBA $200_I$ sends (at block 420) an accept (LS_ACC) to the responder port $210_R$ that the authentication message is accepted for processing. Upon receiving accept, the responder HBA $200_R$ activates (at block 422) the created security association $300_i$, such as by setting the active flag 314 to start transmitting to the initiator port $210_I$ using the generated key 304 for the security association $300_i$. After activating the security association, the responder HBA $200_R$ sends (at block 424) an authentication done message (AUTH Done) to the initiator port $210_I$ indicating that both security association initialization and authentication is completed and transmissions may now be encrypted and decrypted using the key 304 for the newly established security association $300_i$. Upon receiving the authentication done message, the initiator HBA $200_I$ activates (at block 426) the created security association $300_i$, such as by setting the active flag 314 to start transmitting to the responder port $210_R$ using the generated key 304 for the security association $300_i$. After activating the security association, the initiator HBA $200_I$ sends (at block 428) an accept (LS_ACC) to the responder port $220_R$ that the security association $300_i$ is activated and starts transmitting (at block 430) I/O to the responder port $210_R$ using the new security association key 304.

Figure 5:
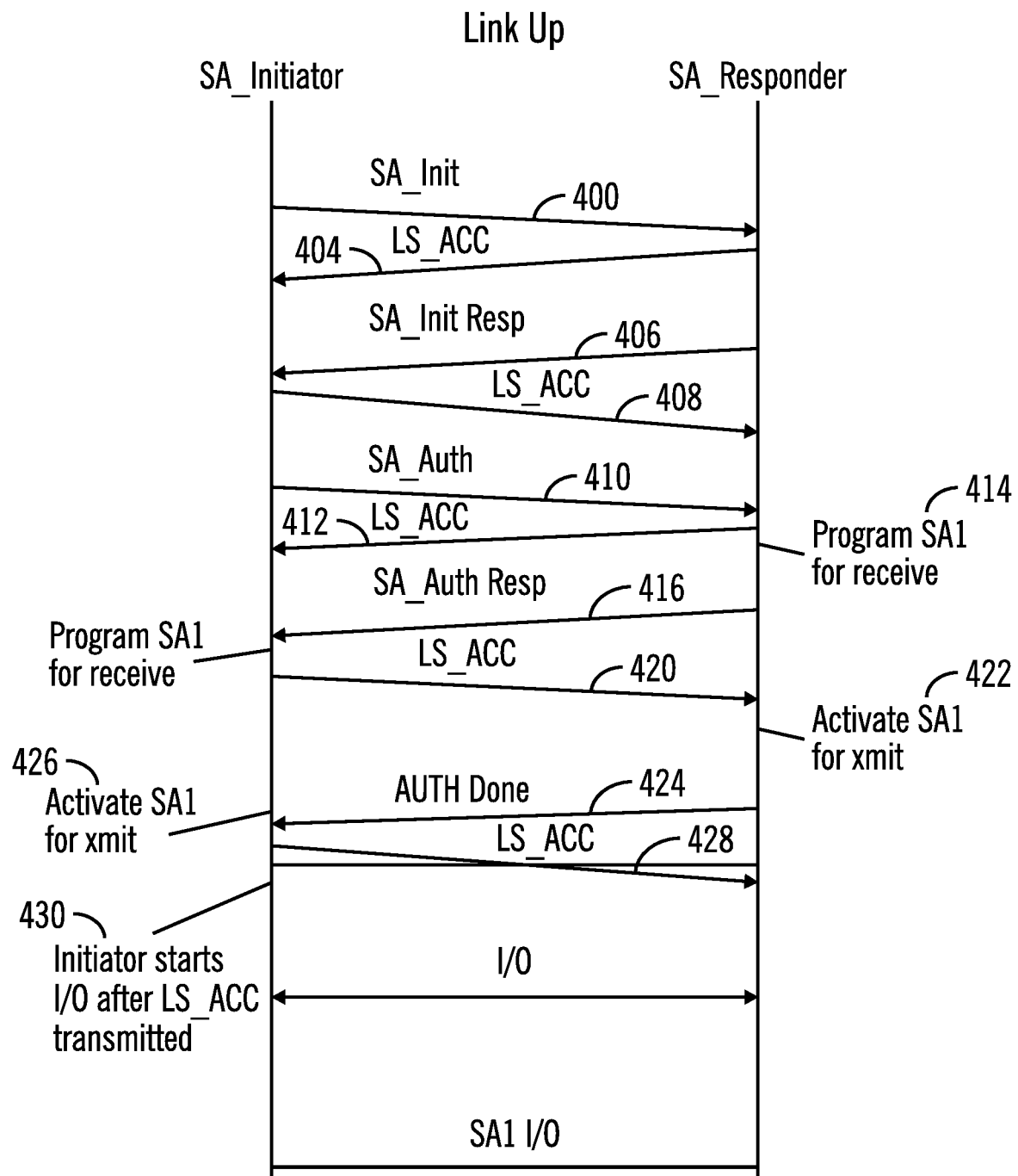
FIG. 5 illustrates a message flow for the operations of FIG. 4.

FIG. 5 provides a timing chart illustrating the flow of the messages in FIG. 4 and timing of operations, with transmissions numbered with corresponding blocks in FIG. 4.

With the embodiment of FIGS. 4 and 5, the responder HBA $200_R$ provides notification that all steps to establish the security association and authentication have completed successfully by sending the authentication done message (at block 424). Once the initiator HBA $200_I$ accepts the authentication done message which occurs after the security association $300_i$ has been programmed at the nodes, then both the initiator and responder nodes can begin transmission with the new security association $300_i$ and key 304. With the authentication done message, the responder signals capability to transmit with the new key 304 and signals the initiator to also begin transmission using the new key 304 of the new security association. In this way, with the described embodiment, the security association management protocol is combined with mutual authentication to allow the initiator and responder to begin secure transmissions using a new security association.

Further, with described embodiments, a host $102_i$ may always function as the initiator in establishing a security association with a storage controller 104 to avoid having to negotiate between nodes the node that will function as the initiator.

Figure 6:
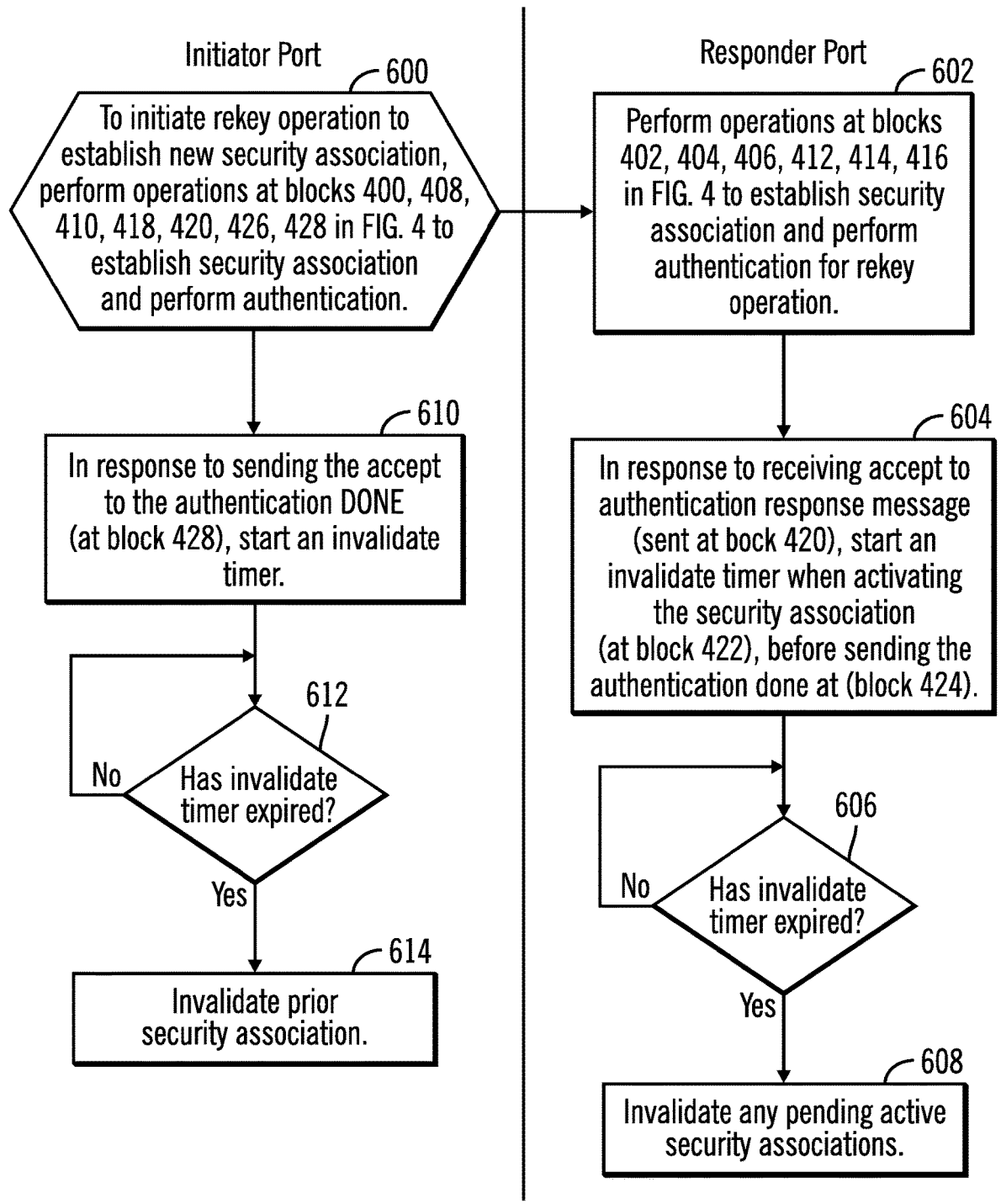
FIG. 6 illustrates an embodiment of operations to perform a rekey operation to generate a new security association and authentication between an initiator and responder nodes and delete the old security association.

FIG. 6 illustrates an embodiment of operations performed between the initiator HBA $200_I$ and the responder HBA $200_R$ to perform a rekey operation to establish a new security association for a new key to use for future transmissions after an initial security association is established according to the operations of FIGS. 4 and 5. To initiate a rekey operation to create a new security association $300_i$ and key 304, the initiator HBA $200_I$ performs (at block 600) operations at blocks 400, 408, 410, 418, 420, 426, 428 in FIG. 4 to establish security association and perform authentication for the new security association. The responder HBA $200_R$ performs (at block 602) operations at blocks 402, 404, 406, 412, 414, 416 in FIG. 4 to establish a security association 300i and perform authentication for the rekey operation. Upon receiving the accept to the authentication response message, sent by the initiator HBA 200$_I$ at block 420, the responder HBA 200$_R$ starts (at block 604) an invalidate timer 208 when activating the security association 300i (at block 422), before sending the authentication done at (block 424). Upon the invalidate timer expiring (at block 606), the responder HBA 200$_R$ invalidates (at block 608) any pending active security associations 300$_{i-1}$. Upon invalidating the prior security association, the responder HBA 200$_R$ would only use the new security association 300i created as part of the rekey operation. Further, when the initiator HBA 200$_I$ sends the accept to the authentication done (at block 428), it would also start (at block 610) its own invalidate timer 208. Upon expiration (at block 612) of the invalidate timer 208 at the initiator HBA 200$_I$, the prior security associations 300$_{i-1}$ at the initiator HBA 200$_I$ is invalidated (at block 614).

Figure 7:
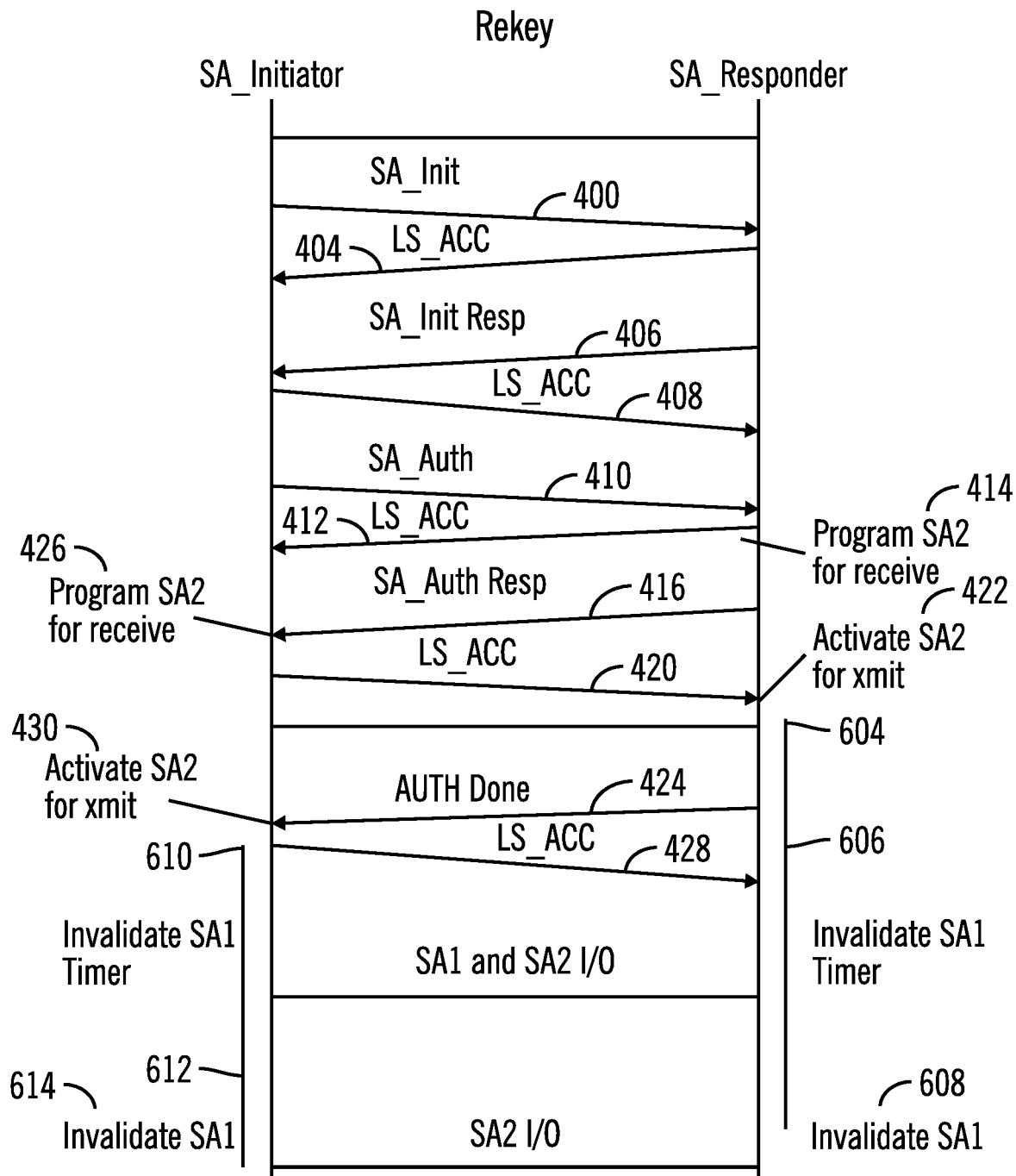
FIG. 7 illustrates a message flow for the operations of FIG. 6.

FIG. 7 provides a timing chart illustrating the flow of the messages in FIG. 6 and timing of the rekey operations, with transmissions numbered with corresponding blocks in FIG. 6. Reference numbers from FIG. 4 shown in FIG. 7 refer to the security association initialization operations of FIG. 4 as performed with respect to the establishment of a second or new security association as described in FIG. 6.

With the embodiment of operations of FIGS. 6 and 7, after completion of the rekey operation, both the initiator port 210$_I$ and responder port 210$_R$ have begun queuing I/O requests for transmission using the new transmission keys. Moreover, both the initiator and responder start invalidate timers 208 that provide sufficient time to allow the queued I/O requests transmitted using the previous key and security association 300$_{i-1}$ to be processed and flushed out of the I/O queue 204 before invalidating the previous security association 300$_{i-1}$ needed to process the I/O requests sent before activation of the new keys. In this way, by the time the previous security association 300$_{i-1}$ is invalidated, there are likely no more I/O requests in the I/O queue 204 encrypted using the previous security association 300$_{i-1}$. Further, in one embodiment, the responder HBA 200$_R$ may start the invalidate timer 208 before the initiator HBA 200$_I$, because the responder activates the new security association in response to the accept (at block 422) before the imitator activates its new security association in response to the later sent authentication done message (at block 424).

Figure 8A:
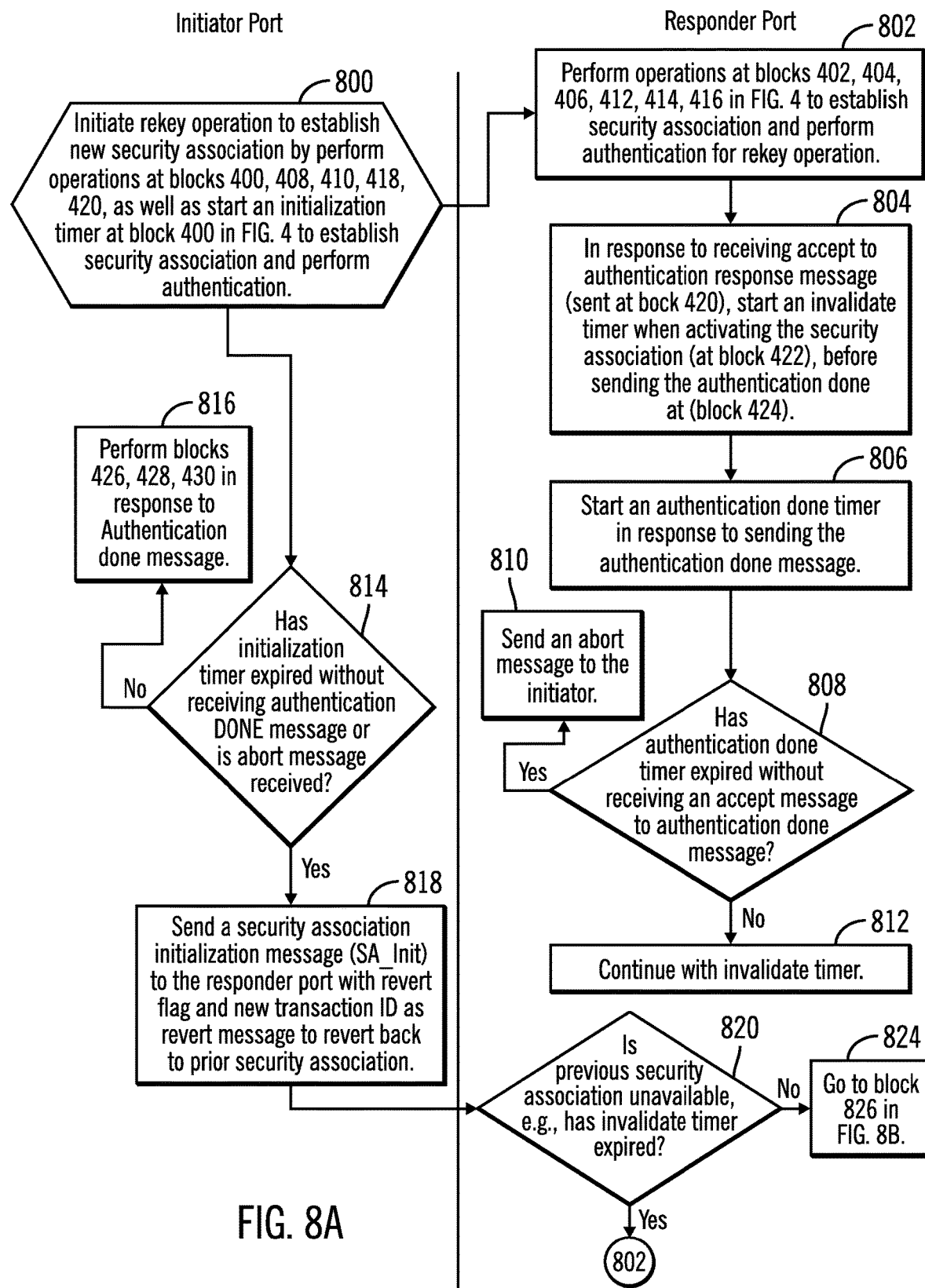
FIGS. 8a and 8b illustrate operations to revert back to using a previous security association if the rekey operation to establish a new security association fails.
Figure 8B:
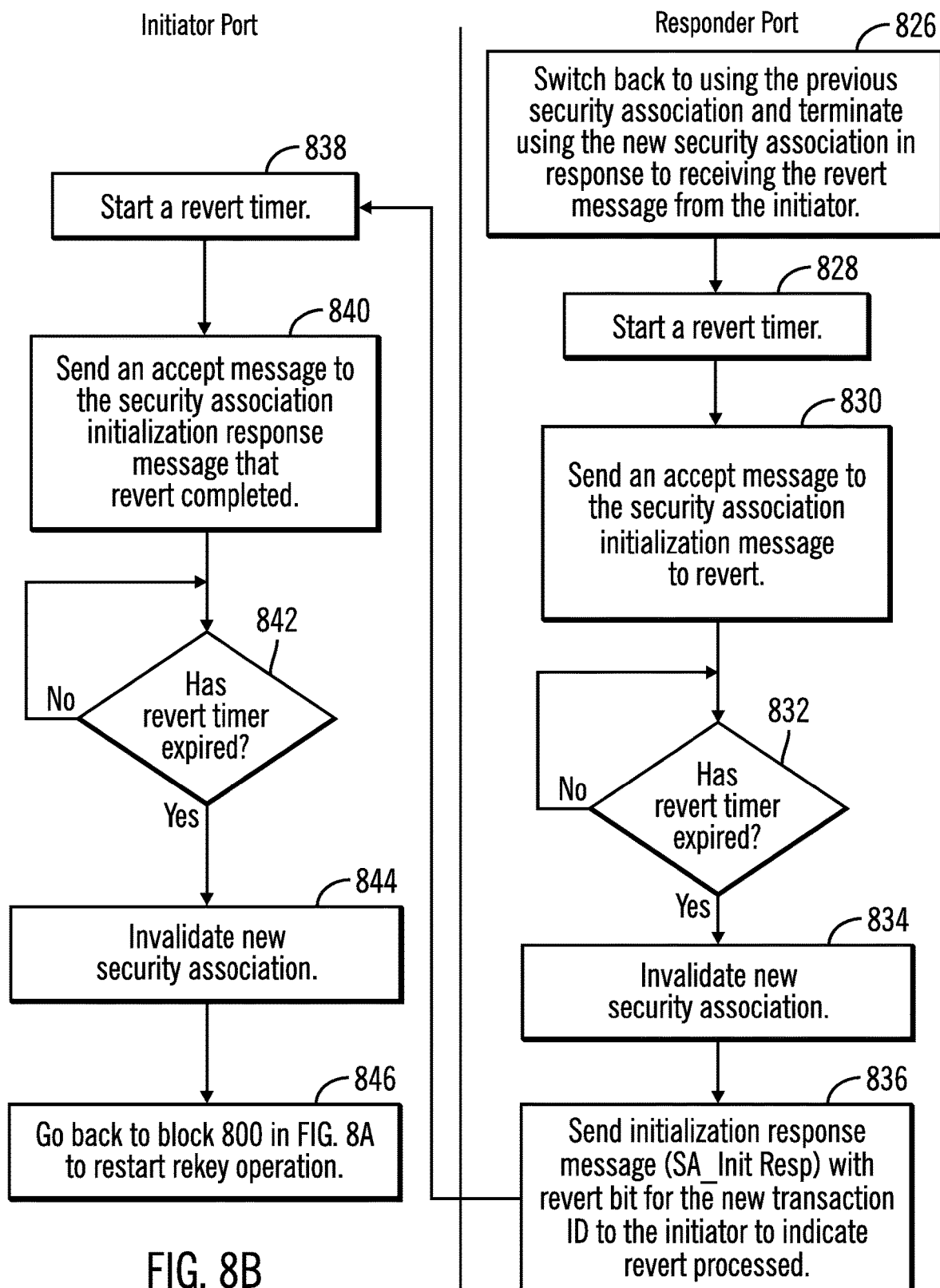
Figure 9:
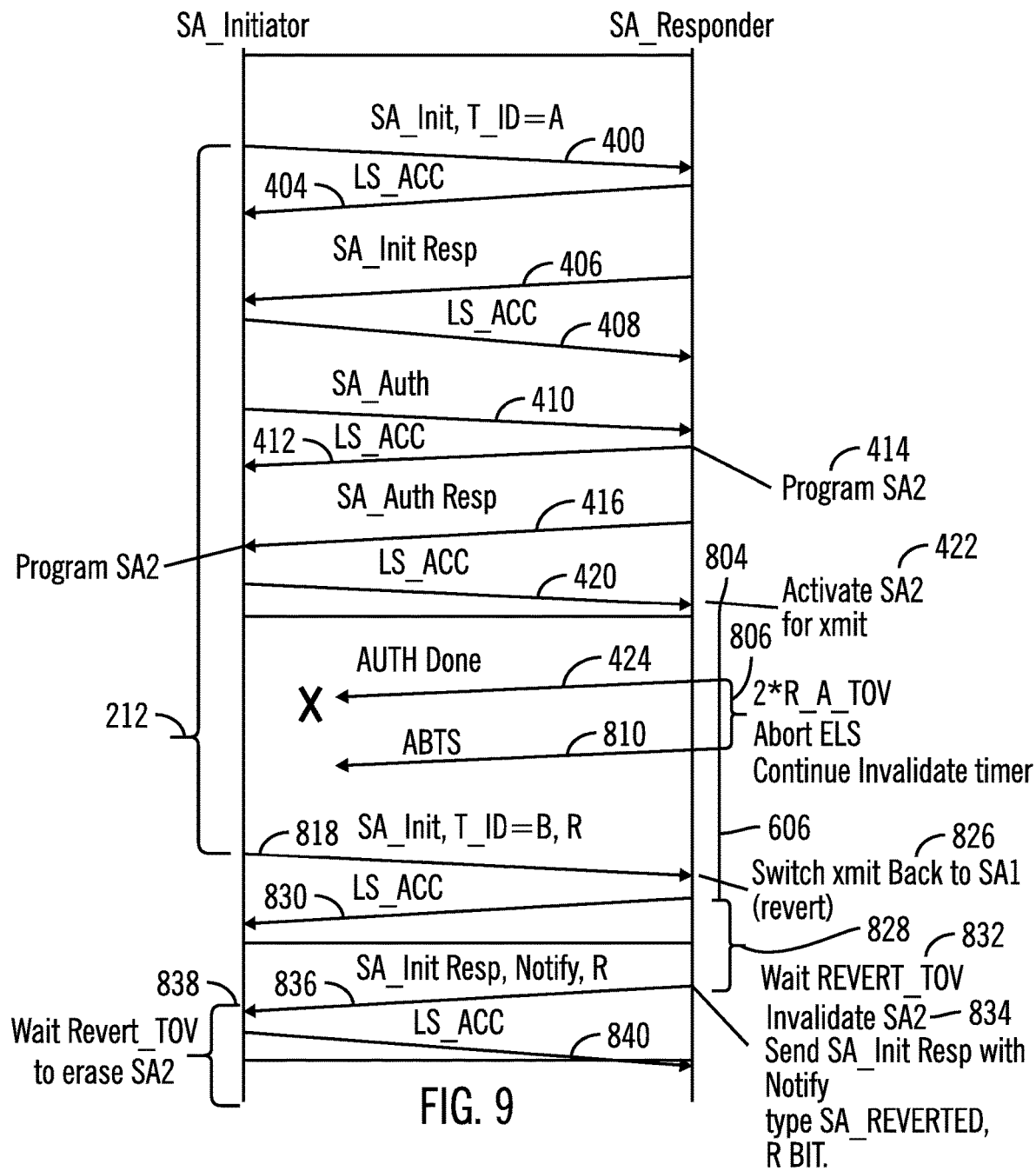
FIG. 9 illustrates a message flow for the operations of FIGS. 8a and 8b.

FIGS. 8a, 8b and 9 illustrate an embodiment of operations performed by the security association manager 206 in the initiator HBA 200$_I$ initiator and the responder HBA 200$_R$ to handle a failure of the rekey operation the responder HBA 200$_R$. Upon detecting a failure of the rekey operation to establish a new security association, the initiator HBA 200$_I$ performs operations to revert to use the previous security association 300$_{i-1}$ existing prior to the security association 300$_i$ being established as part of a rekey operation.

With respect to FIGS. 8a and 8b, control begins with the initiator HBA 200$_I$ initiating (at block 800) a rekey operation to establish new security association 300$_i$ to replace the current security association 300$_{i-1}$ by performing the operations at blocks 400, 408, 410, 418, 420, as well as start an initialization timer 212 at block 400, in FIG. 4 to establish security association and perform authentication. In response to the rekey operation started by the initiator HBA 200$_I$, the responder HBA 200$_R$ performs (at block 802) operations at blocks 402, 404, 406, 412, 414, 416 in FIG. 4 to establish security association and perform authentication for the rekey operation. In response to receiving (at block 804) an accept message from the initiator HBA 200$_I$ to the authentication response message (sent by the initiator at block 420), the responder HBA 200$_R$ starts an invalidate timer 208 when activating the security association 300$_i$ (at block 422), before sending the authentication done message (at block 424). The responder HBA 200$_R$ further starts (at block 806) an authentication done timer 216.

If (at block 808) the authentication done timer 216 expires without receiving an accept message (at block 428) to authentication done message (at block 424), then the responder HBA 200$_R$ sends (at block 810) an abort message to abort the authentication done message. The invalidate timer 208 continues at the responder HBA 200$_R$ after the abort message is sent. If (at block 808) the accept message to the authentication done message is received before the authentication done timer 216 expires, then the responder HBA 200$_R$ continues with the invalidate timer 208 (at block 812).

With respect to the initiator HBA 200$_I$, if (at block 814) the authentication done message is received before the initialization timer 212 expires or there is no abort message received, then the initiator HBA 200$_I$ performs (at block 816) operations at blocks 426, 428, and 40 in FIG. 4 to activate the new security association 300$_i$ and start transmitting with the new security key 304. If (at block 814) the initialization timer 212 expires before receiving an authentication done message or the abort message is received, then the failure of the authentication done and rekey operation are detected, and the initiator HBA 200$_I$ sends (at block 818) a revert message. In one embodiment, the revert message may comprise a security association initialization message (SA_Init) to the responder port with a revert flag and a new transaction identifier (ID) to cause the responder HBA 200$_R$ to revert back to using the previous security association 300$_{i-1}$ for the port.

Upon receiving the revert message, such as the security initialization message with the revert flag, the responder HBA 200$_R$ determines (at block 820) whether the previous security association 300$_{i-1}$ is still available. The previous security association 300$_{i-1}$ may not be available if the invalidate timer 208 at the responder HBA 200$_R$ expired, resulting in invalidating the previous security association 300$_{i-1}$ before receiving the revert message. If (at block 820) the previous security association 300$_{i-1}$ is not available, then control proceeds back to block 802 to process the security association initialization message as a new rekey operation to create a new security association for the new transaction ID. If (at block 820) the previous security association 300$_{i-1}$ is available, then control proceeds (at block 824) to block 826 in FIG. 8b.

At block 826, the responder HBA 200$_R$ switches back to using the previous security association 300$_{i-1}$ and terminates using the new security association 300$_i$ in response to receiving the revert message from the initiator. The responder HBA 200$_R$ starts (at block 828) the revert timer 214 and sends (at block 830) an accept message to the security association initialization message to revert. Upon the revert timer 214 expiring (at block 832), the responder HBA 200$_R$ invalidates (at block 834) the new security association 300$_i$. The responder HBA 200$_R$ sends (at block 836) an initialization response message (SA_Init Resp) with the revert bit and the new transaction ID to the initiator HBA 200$_I$ to indicate the revert was processed only if the responder HBA 200$_R$ can revert back to the previous security association 300$_{i-1}$. The revert timer 214 is set to provide the responder HBA 200$_R$ time to complete processing any pending messages encrypted with the new key 304 before invalidating the new security association 300$_i$ and new key 304.

Upon receiving the initialization response message with the revert bit from the responder HBA $200_R$, the initiator HBA $200_I$ starts (at block 838) a revert timer and sends (at block 840) an accept message to the responder indicating that the initiator accepted that the responder completed the revert. Upon the revert timer 214 expiring (at block 842), the initiator HBA $200_I$ invalidates (at block 844) the new security association $300_i$ programmed in the initiator HBA $200_I$ at block 418 (FIG. 4) and proceeds (at block 846) back to block 800 in FIG. 8a to restart the rekey operation after the reverting completed. By waiting for the revert timer 214 to expire, the initiator HBA $200_I$ is able to use the new key 304 from the new security association $300_i$ to process any message generated by the responder HBA $200_R$ using the new security association $300_i$ after activating the new security association $300_i$ at block 804 (FIG. 8). After the revert timers 214 at both the initiator HBA $200_I$ and responder HBA $200_R$ expire, any messages the responder generated using the new security association $300_i$ should have been flushed out of the systems so the new security association $300_i$ is no longer needed.

FIG. 9 provides a timing chart illustrating the flow of the messages in FIGS. 8a, 8b and timing of the revert operations, with transmissions numbered with corresponding blocks in FIG. 8a, 8b.

With the embodiment of operations of FIGS. 8a, 8b, and 9, if a failure of a rekey operation is detected, such as if the initiator fails to process an authentication done message sent by the responder after activating and beginning to use the new security association, then the initiator may start a revert operation to cause the responder to revert back to using the prior security association and invalidate the new security association that was activated. In described embodiments, the responder starts a revert timer after receiving the message to revert from the initiator to wait for the revert timer to expire before invalidating the new security association. In this way, the new security association may continue to be used to process messages encrypted with the key for the new security association between the time the new security association was activated and the time the responder switched back to using the previous security association. Further, the initiator starts the revert timer after receiving the response that the responder completed the revert operation to wait the revert timer timeout value before invalidating the new security association programmed at the initiator to allow use of the new security association to access any messages the responder encrypted with the new security association before invalidating.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
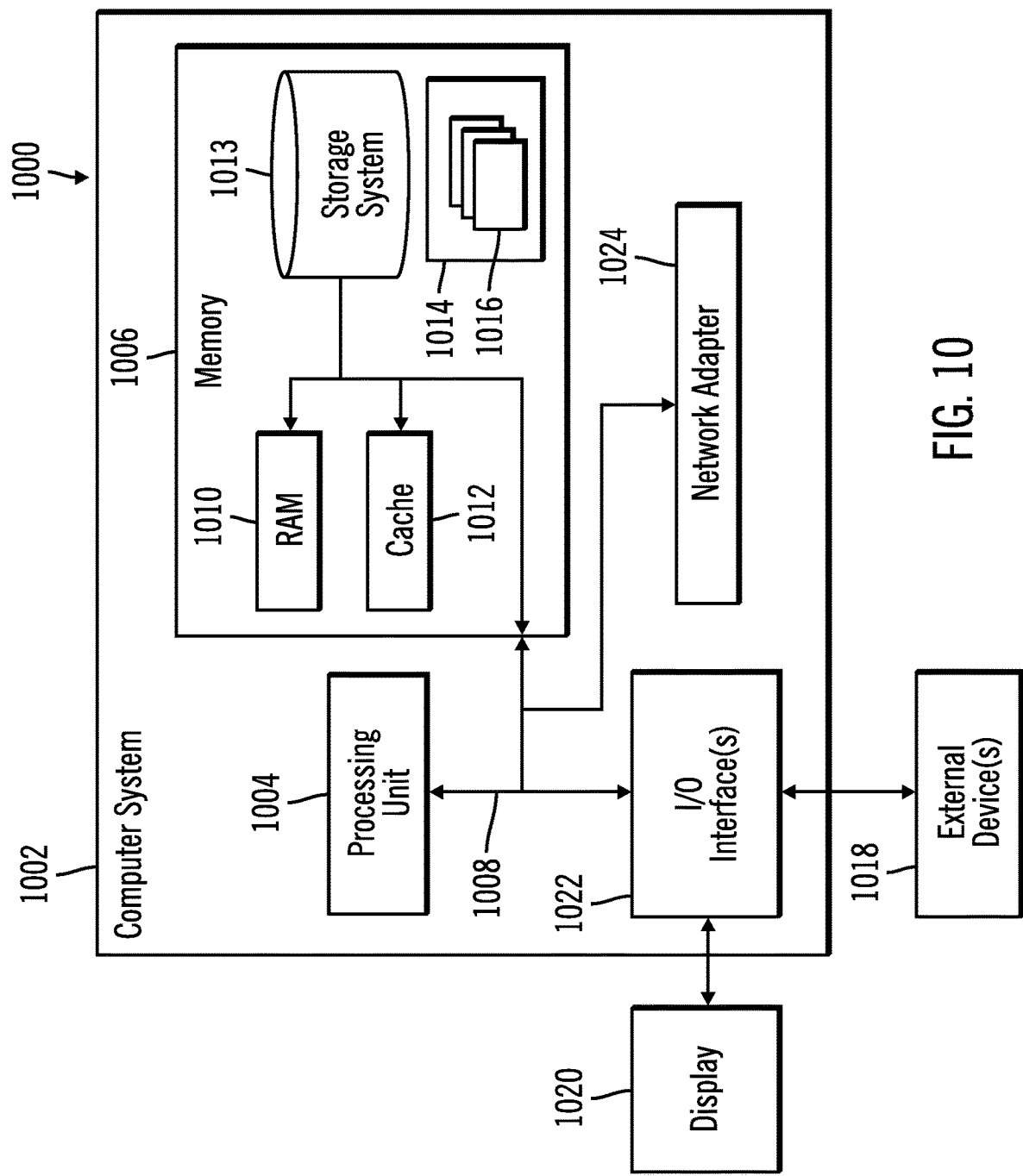
FIG. 10 illustrates a computing environment in which the components of FIG. 1 may be implemented.

The computational components of FIGS. 1 and 2, including the hosts $102_1, 102_2 \ldots 102n$, storage controller 104, and host bus adaptor $200_i$ may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for secure communication between an initiator and a responder over a network, the computer program product comprising a computer readable storage medium having computer readable program code implemented at the initiator that when executed performs operations, the operations comprising:

maintaining a first security association with the responder having a first key to use to encrypt and decrypt data transmitted with the responder;

initiating a rekey operation to establish a second security association with the responder using a second key;

detecting a failure of the rekey operation after the responder started using the second key for transmissions;

sending a revert message to the responder to revert back to using the first security association and first key in response to detecting the failure of the rekey operation; and receiving a response from the responder to the revert message indicating that the second security association is invalidated and the responder reverted back to using the first security association for transmissions.

2. The computer program product of claim 1, wherein the operations further comprise:

sending a message to the responder to initiate the rekey operation and establish the second security association with the responder including key material used to generate the second key for the second security association; and starting a timer in response to sending the message, wherein the failure of the rekey operation is detected in response to the timer expiring before receiving a message from the responder indicating that the second security association is activated.

3. The computer program product of claim 2, wherein the message from the responder indicating that the second security association is activated comprises an authentication done message.

4. The computer program product of claim 1, wherein the operations further comprise:

starting a revert timer in response to receiving the response from the responder to the revert message, wherein during the revert timer the second key is used to access secure transmissions from the responder secured with the second key of the second security association at the responder; and invalidating the second security association in response to the revert timer expiring.

5. The computer program product of claim 4, wherein the operations further comprise:

retrying the rekey operation in response to the revert timer expiring.

6. A computer program product for secure communication between an initiator and a responder over a network, the computer program product comprising a computer readable storage medium having computer readable program code implemented at the initiator that when executed performs operations, the operations comprising:

maintaining a first security association with the responder having a first key to use to encrypt and decrypt data transmitted with the responder;

sending a security association initialization message to the responder to establish a second security association with the responder including key material used to generate a second key for the second security association;

in response to receiving a security association initialization response to accept the second security association, sending an authentication message to the responder to program the responder to establish authentication between the responder and the initiator;

in response to not receiving an authentication done message from the responder after activating the second security association upon expiration of a timer, sending a revert message to the responder to revert back to using the first security association and first key; and receiving a response from the responder to the revert message indicating that the second security association is invalidated and the responder reverted back to using the first security association for transmissions.

7. The computer program product of claim 6, wherein the operations further comprise:
in response to receiving an authentication message response to the sent authentication message, programming the initiator with the second security association and the second key.

8. The computer program product of claim 6, wherein the timer is started in response to the sending the security association initialization message to the responder.

9. The computer program product of claim 6, wherein the operations further comprise:
receiving an abort message from the responder following the responder sending the authentication done message before the timer expires; and
sending the revert message to the responder to revert back to using the first security association and first key in response to receiving the abort message before the timer expires.

10. A system for secure communication between an initiator and a responder over a network, comprising:
a processor; and
a computer readable storage medium having computer readable program code implemented at the initiator that when executed performs operations, the operations comprising:
maintaining a first security association with the responder having a first key to use to encrypt and decrypt data transmitted with the responder;
initiating a rekey operation to establish a second security association with the responder using a second key;
detecting a failure of the rekey operation after the responder started using the second key for transmissions;
sending a revert message to the responder to revert back to using the first security association and first key in response to detecting the failure of the rekey operation; and
receiving a response from the responder to the revert message indicating that the second security association is invalidated and the responder reverted back to using the first security association for transmissions.

11. The system of claim 10, wherein the operations further comprise:
sending a message to the responder to initiate the rekey operation and establish the second security association with the responder including key material used to generate the second key for the second security association; and
starting a timer in response to sending the message, wherein the failure of the rekey operation is detected in response to the timer expiring before receiving a message from the responder indicating that the second security association is activated.

12. The system of claim 11, wherein the message from the responder indicating that the second security association is activated comprises an authentication done message.

13. The system of claim 10, wherein the operations further comprise:
starting a revert timer in response to receiving the response from the responder to the revert message, wherein during the revert timer the second key is used to access secure transmissions from the responder secured with the second key of the second security association at the responder; and
invalidating the second security association in response to the revert timer expiring.

14. The system of claim 13, wherein the operations further comprise:
retrying the rekey operation in response to the revert timer expiring.

15. A system for secure communication between an initiator and a responder over a network, comprising:
a processor; and
a computer readable storage medium having computer readable program code implemented at the initiator that when executed performs operations, the operations comprising:
maintaining a first security association with the responder having a first key to use to encrypt and decrypt data transmitted with the responder;
sending a security association initialization message to the responder to establish a second security association with the responder including key material used to generate a second key for the second security association;
in response to receiving a security association initialization response to accept the second security association, sending an authentication message to the responder to program the responder to establish authentication between the responder and the initiator;
in response to not receiving an authentication done message from the responder after activating the second security association upon expiration of a timer, sending a revert message to the responder to revert back to using the first security association and first key; and
receiving a response from the responder to the revert message indicating that the second security association is invalidated and the responder reverted back to using the first security association for transmissions.

16. The system of claim 15, wherein the operations further comprise:
in response to receiving an authentication message response to the sent authentication message, programming the initiator with the second security association and the second key.

17. The system of claim 15, wherein the timer is started in response to the sending the security association initialization message to the responder.

18. The system of claim 15, wherein the operations further comprise:
receiving an abort message from the responder following the responder sending the authentication done message before the timer expires; and
sending the revert message to the responder to revert back to using the first security association and first key in response to receiving the abort message before the timer expires.

19. A method for secure communication between an initiator and a responder over a network, comprising:
maintaining, by the initiator, a first security association with the responder having a first key to use to encrypt and decrypt data transmitted with the responder;
initiating, by the initiator, a rekey operation to establish a second security association with the responder using a second key;
detecting, by the initiator, a failure of the rekey operation after the responder started using the second key for transmissions;

sending, by the initiator, a revert message to the responder to revert back to using the first security association and first key in response to detecting the failure of the rekey operation; and receiving a response from the responder to the revert message indicating that the second security association is invalidated and the responder reverted back to using the first security association for transmissions.

20. The method of claim 19, further comprising:

sending, by the initiator, a message to the responder to initiate the rekey operation and establish the second security association with the responder including key material used to generate the second key for the second security association; and starting, by the initiator, a timer in response to sending the message, wherein the failure of the rekey operation is detected in response to the timer expiring before receiving a message from the responder indicating that the second security association is activated.

21. The method of claim 19, further comprising starting a revert timer in response to receiving the response from the responder to the revert message, wherein during the revert timer the second key is used to access secure transmissions from the responder secured with the second key of the second security association at the responder; and invalidating the second security association in response to the revert timer expiring.

22. The method of claim 21, further comprising:

retrying the rekey operation in response to the revert timer expiring.

* * * * *